United States Patent
Kandregula et al.

(10) Patent No.: US 8,549,179 B2
(45) Date of Patent: Oct. 1, 2013

(54) COLLABORATIVE STATE MACHINE FRAMEWORK FOR USE IN A COMMUNICATION NETWORK

(75) Inventors: Anil K. Kandregula, Dallas, TX (US); Michael D. Hall, Carrollton, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 3437 days.

(21) Appl. No.: 10/889,908

(22) Filed: Jul. 13, 2004

(65) Prior Publication Data

US 2006/0015877 A1  Jan. 19, 2006

(51) Int. Cl.
*G06F 15/16* (2006.01)

(52) U.S. Cl.
USPC ........... 709/250; 709/223; 370/259; 370/271; 718/100

(58) Field of Classification Search
USPC ........................................ 709/250
See application file for complete search history.

(56) References Cited

U.S. PATENT DOCUMENTS

| | | | | |
|---|---|---|---|---|
| 4,325,120 A | * | 4/1982 | Colley et al. | 711/202 |
| 6,266,535 B1 | * | 7/2001 | Cullen et al. | 455/461 |
| 6,456,604 B1 | * | 9/2002 | Lee et al. | 370/328 |
| 6,912,230 B1 | * | 6/2005 | Salkini et al. | 370/466 |
| 6,952,411 B2 | * | 10/2005 | Sinnarajah et al. | 370/335 |
| 6,967,933 B2 | * | 11/2005 | Chapuran et al. | 370/271 |
| 7,302,688 B2 | * | 11/2007 | Shitahaku | 718/105 |
| 2002/0040409 A1 | * | 4/2002 | Matena et al. | 709/315 |
| 2003/0039231 A1 | * | 2/2003 | Sinnarajah et al. | 370/335 |
| 2005/0144218 A1 | * | 6/2005 | Heintz | 709/202 |

\* cited by examiner

*Primary Examiner* — Greg C Bengzon

(57) ABSTRACT

An apparatus for use in a communication network comprises a state machine capable of transitioning between a plurality of states. The plurality of states comprises at least two concurrent states. The state machine operates in the at least two concurrent states concurrently. Each of the concurrent states may be associated with a task. At least a portion of the task associated with one of the concurrent states may be performed concurrently with at least a portion of the task associated with another of the concurrent states when the state machine operates in the concurrent states.

20 Claims, 5 Drawing Sheets

COLLABORATIVE STATE MACHINE FRAMEWORK FOR USE IN A COMMUNICATION NETWORK

TECHNICAL FIELD

This disclosure relates generally to communication networks and more specifically to a collaborative state machine framework for use in a communication network.

BACKGROUND OF THE INVENTION

Communication networks often use finite state machines (FSM) to control the establishment of communication sessions and other network operations. For example, a code division multiple access (CDMA) wireless network often uses a finite state machine to control the setup of telephone calls in the network. The state machine typically includes a null or initial state, a network setup state, a link setup state, and a traffic state. The null state typically represents a state where no action is occurring to satisfy a request for service. The network setup state and the link setup state typically represent tasks needed to establish a connection and provide service in the network. The traffic state typically represents a state where voice traffic is carried over the network.

A problem with conventional communication networks is that the finite state machines often operate sequentially. In other words, a state machine cannot progress (or transition) from one state to the next state until all actions associated with the previous state have been completed. This often increases the time needed to satisfy a request for service. This delay may be particularly problematic when the requested service has stringent time requirements.

Therefore, there is a need in the art for improved telecommunications equipment that implements state machines that are capable of operating in a non-sequential manner. In particular, there is a need in the art for telecommunication devices that use state machines that can transition from a first state to a second state without waiting for all actions associated with a previous state to complete.

SUMMARY OF THE INVENTION

The present invention provides a collaborative state machine framework for use in telecommunication devices that enables state machines to transition from a first state to a second state without waiting for all actions associated with a previous state to complete.

According to an exemplary embodiment of the present invention, an apparatus for use in a communication network includes a state machine that transitions between a plurality of states. The plurality of states includes at least two concurrent states, and the state machine is capable of operating concurrently in the at least two concurrent states.

According to the exemplary embodiment of the present invention, each of the concurrent states is associated with a task. At least a portion of the task associated with one of the concurrent states is performed concurrently with at least a portion of the task associated with another of the concurrent states when the state machine operates in the concurrent states.

According to another embodiment of the present invention, a communication network includes a plurality of components and at least one state machine. Each of the components is capable of communicating with at least one other of the components and at least one of the components is capable of communicating with one or more communication devices. The at least one state machine transitions between a plurality of states. At least one of the states is associated with at least one task that provides a service to at least one of the communication devices. The plurality of states includes at least two concurrent states and the at least one state machine operates concurrently in the at least two concurrent states.

According to yet another embodiment of the present invention, a method for use in a communication network comprises the step of transitioning from an initial state to a plurality of additional states in response to a request for service. At least two of the additional states include at least two concurrent states. The step of transitioning to the additional states includes the step of operating in the at least two concurrent states concurrently. The method also includes the step of transitioning to a final state associated with providing the requested service.

One or more technical features may be present according to various embodiments of this disclosure. Particular embodiments of this disclosure may exhibit none, some, or all of the following features depending on the implementation. For example, in some embodiments, an improved collaborative state machine framework for use in a communication network is provided. In particular embodiments, a state machine is capable of launching or transitioning to two or more states concurrently. Tasks associated with the concurrent states may then be performed concurrently. This may allow, for example, multiple network resources to concurrently perform actions needed to satisfy a request for service. Because these actions are performed concurrently or at least partially overlap, the time required to satisfy the request for service may be reduced.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely. Definitions for certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

FIGS. 1 through 5, discussed below, and the various embodiments used to describe the principles of this disclosure are by way of illustration only and should not be construed in any way to limit the scope of the invention. Those skilled in the art will understand that the principles of this disclosure may be implemented in any suitable communication network or device.

Figure 1:
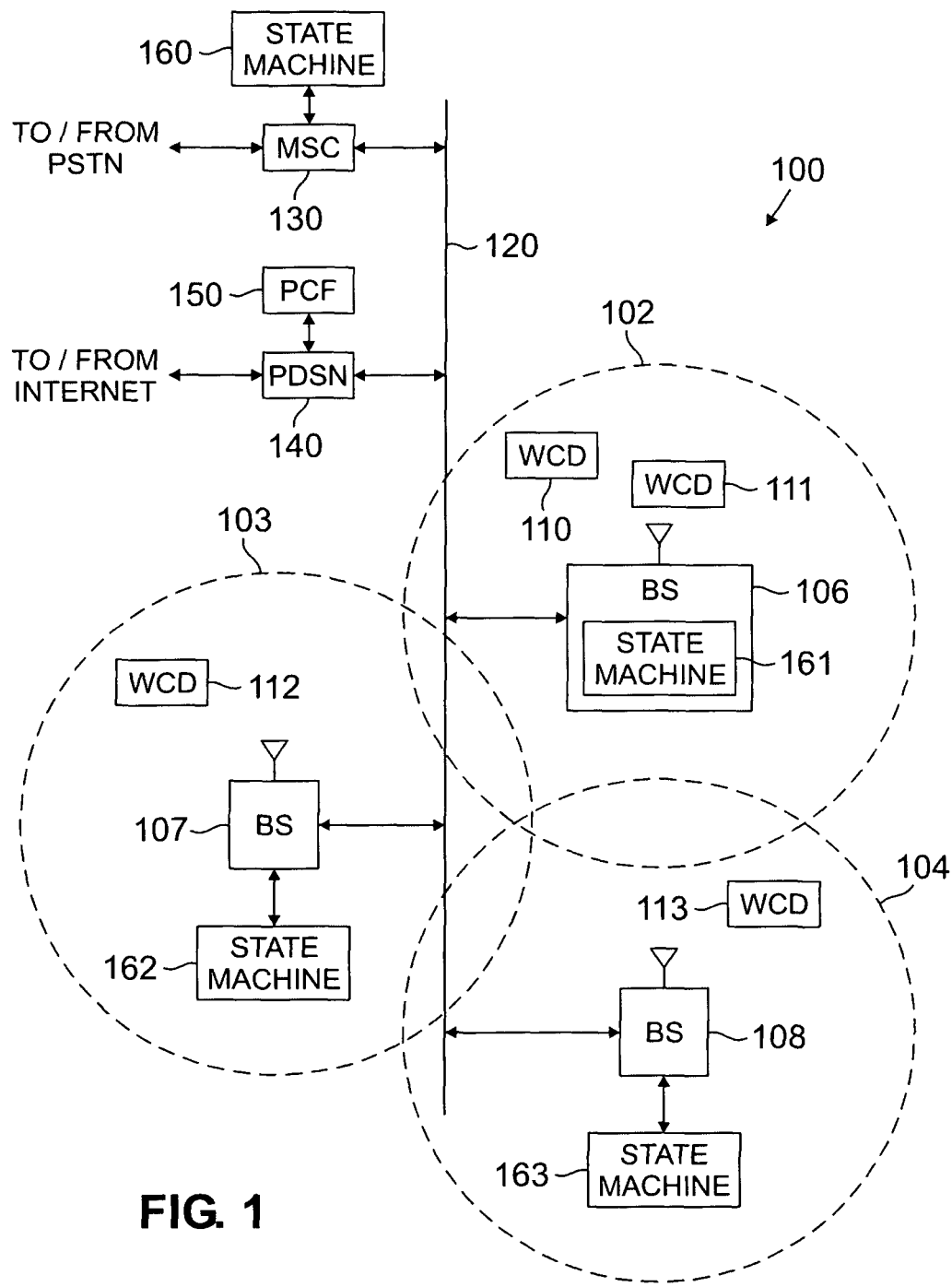
FIG. 1 illustrates a communication network that uses a collaborative state machine framework according to one embodiment of this disclosure.

FIG. 1 illustrates exemplary communication network 100, which uses a collaborative state machine framework according to the principles of the present invention. In the exemplary embodiment, communication network 100 represents a wireless network. Communication network 100 shown in FIG. 1 is for illustration only. Other communication networks, including wireline networks, may be used without departing from the scope of the present invention.

Communication network 100 comprises a plurality of cell sites 102-104. Each of cell sites 102-104 comprises one of a plurality of base stations (BS) 106-108. Each one of base stations 106-108 communicates with one or more wireless communication devices (WCD) 110-113. In one embodiment of the present invention, base stations 106-108 may communicate with wireless communication devices 110-113 over code division multiple access (CDMA) channels according to the IS-2000-C standard (i.e., Release C of CDMA2000).

Each of wireless communication devices 110-113 may represent a mobile wireless device, such as a cell phone, a Personal Communications System (PCS) handset, a personal digital assistant (PDA) handset, a portable computer, a telemetry device, or the like. Each of wireless communication devices 110-113 may represent any other suitable device operable to communicate with one or more base stations 106-108 via wireless links, including stationary and mobile wireless devices.

The dotted lines in FIG. 1 show the approximate boundaries of cell sites 102-104 in which base stations 106-108 are located. Cell sites 102-104 are shown as being approximately circular for the purposes of illustration and explanation only. It will be understood that cell sites 102-104 may have many other shapes (including irregular shapes), depending on the cell configuration and natural and man-made obstructions. In some embodiments, each of cell sites 102-104 includes a plurality of sectors, and directional antennas coupled to base stations 106-108 may provide service for each sector. The embodiment shown in FIG. 1 illustrates base stations 106-108 in the centers of cell sites 102-104. In other embodiments, the directional antennas may be positioned in corners of the sectors or in any other suitable location or locations. Communication network 100 is not limited to any particular cell site configuration.

According to an exemplary embodiment of the present invention, each of base stations 106-108 may comprise a base station controller and at least one base transceiver subsystem.

The base station controllers are operable to manage wireless communication resources, including the base transceiver subsystems, for specified cells 102-104 within communication network 100. For example, the base transceiver subsystems may include radio frequency (RF) transceivers, antennas, and other electrical equipment located in each of cell sites 102-104. This equipment may include air conditioning units, heating units, electrical supplies, telephone line interfaces, and RF transmitters and RF receivers. For the purposes of simplicity and clarity in explaining the operation of communication network 100, the base transceiver subsystem in each of cells 102-104 and the base station controller associated with each base transceiver subsystem are collectively represented by base stations 106-108, respectively.

Base stations 106-108 are capable of transferring voice and data signals between each other and to and from a public switched telephone network (PSTN) or other network via communication line 120 and mobile switching center (MSC) 130. Base stations 106-108 also may transfer data signals, such as packet data, back and forth from the Internet or other network via communication line 120 and packet data server node (PDSN) 140. Packet control function (PCF) unit 150 is capable of controlling the flow of data packets between base stations 106-108 and PDSN 140. PCF unit 150 may be implemented as part of PDSN 140, as part of base stations 106-108, as a stand-alone device that communicates with PDSN 140, or in any other suitable manner. Communication line 120 provides connections for voice and data circuits between MSC 130 and base stations 106-108.

Communication line 120 may represent any suitable connection, including a T1 line, a T3 line, a fiber optic link, or any other type of data connection. The connections on communication line 120 may transmit analog voice signals or digital voice signals in pulse code modulated (PCM) format, Internet Protocol (IP) format, asynchronous transfer mode (ATM) format, or any other suitable format. In some embodiments, communication line 120 also provides an Internet Protocol (IP) connection or other connection that transfers data packets between base stations 106-108 of communication network 100. For example, communication line 120 may include a local area network (LAN) that provides direct IP connections between base stations 106-108 without using PDSN 140.

In an exemplary embodiment of the present invention, MSC 130 may comprise a switching device that provides services and coordination between the subscribers in communication network 100 and external networks, such as the PSTN or the Internet. In an exemplary embodiment, communication line 120 may include several different data links, where each data link couples one of base stations 106-108 to MSC 130.

In the embodiment shown in FIG. 1, wireless communication device 110 and wireless communication device 111 are located in cell site 102 and are capable of communicating with base station 106. Wireless communication device 112 is located in cell site 103 and is capable of communicating with base station 107, and wireless communication device 113 is located in cell site 104 and is capable of communicating with base station 108.

According to an advantageous embodiment of the present invention, one or more of base stations 106-108 and MSC 130 may comprise, or otherwise have access to, one or more state machines 160-163. As described in more detail below, at least one of state machines 160-163 implements a collaborative state machine framework capable of launching or transitioning to two or more states concurrently in according with the principles of the present invention. Each of the states may be associated with different tasks needed to provide a service in communication network 100. By allowing one or more of state machines 160-163 to operate in two or more states simultaneously, multiple network resources (e.g., base station 108, MSC 130) may concurrently perform the tasks needed to satisfy the request for service. Advantageously, performing these tasks concurrently reduces the time required to satisfy the request for service.

Each of state machines 160-163 may represent any hardware, software, firmware, or combination thereof supporting the execution of multiple tasks in two or more concurrent states. For example, each of state machines 160-163 may comprise one or more software routines executed by one or more processors. For the purposes of this disclosure, the terms "concurrent" and "simultaneous" and their derivatives refer to a total overlap of two or more elements as well as a partial overlap of two or more elements.

Because one or more of state machines 160-163 implements a collaborative state machine framework, state machines 160-163 provide faster response times than conventional finite state machines. For example, conventional finite state machines often operate sequentially and cannot transition from one state to the next state until the completion of all actions associated with the prior state. A collaborative state machine framework according to the principles of the present invention allows tasks for multiple states to be performed at the same time, reducing the time needed to complete the tasks. This may be useful, for example, in applications requiring high throughput and fast response times. These applications may include Voice over Internet Protocol (VoIP), "Push-to-Talk" or rapid connection establishment, instant messaging, location-based services, multimedia streaming, and other applications.

The exemplary embodiment of communication network 100 in FIG. 1 should not be construed to limit the scope of the present invention. Those skilled in the art will readily understand that various changes may be made to communication network 100 without departing from the principles of the present invention. For example, communication network 100 may include any number of cell cites, base stations, and wireless communication devices. Additional state machines may be used in other devise in communication network 100. These may include state machines used by wireless communication devices 110-113, state machines used by MSC 130, state machine used by PDSN 140, and state machines used by PCF 150. In sum, many types of communication devices may use a collaborative state machine framework according to the principles of the present invention, including switches and routers, among others.

Figure 2:
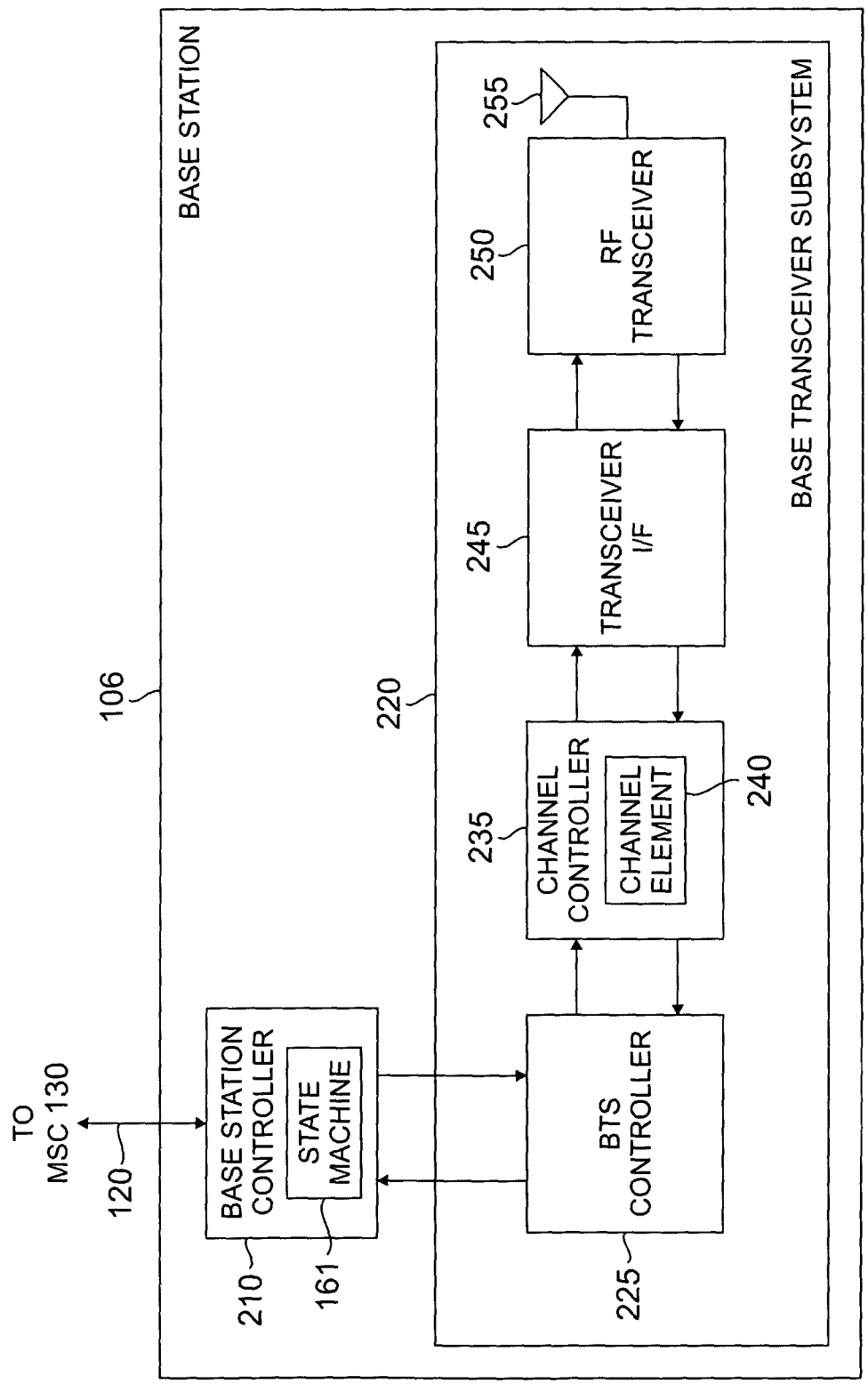
FIG. 2 illustrates one of the base stations of FIG. 1 in greater detail according to one embodiment of this disclosure.

FIG. 2 illustrates exemplary base station 106 in greater detail according to one embodiment of the present invention. Base station 106 is shown of the purposes of illustration only. It will be understood that the components illustrated and described with respect to base station 106 are also implemented in exemplary base stations 107 and 108.

In the exemplary embodiment of the present invention, base station 106 comprises base station controller 210 and at least one base transceiver subsystem 220. Although illustrated with one base transceiver subsystem 220, it will be understood that base station 106 may include any suitable number of base transceiver subsystems without departing from the scope of the present invention.

Base station controller 210 manages the resources in cell site 102, including base transceiver subsystem 220. As described in more detail below, base station controller 210 may include or otherwise have access to state machine 161. In the illustrated embodiment, base transceiver subsystem 220 comprises base transceiver subsystem (BTS) controller 225, channel controller 235 (which comprises at least one channel element 240), transceiver interface (IF) 245, radio-frequency (RF) transceiver unit 250, and antenna array 255. BTS controller 225 may comprise processing circuitry and memory capable of executing an operating program that controls the overall operation of base transceiver subsystem 220 and communicates with base station controller 210.

Under normal conditions, BTS controller 225 directs the operation of channel controller 235, which may include a number of channel elements such as channel element 240. Each channel element is capable of performing bidirectional communications in a forward channel and a reverse channel. A "forward channel" refers to outbound signals from base station 106 to a wireless communication device, and a "reverse channel" refers to inbound signals from a wireless communication device to base station 106.

Transceiver IF 245 transfer the bidirectional channel signals between channel controller 235 and RF transceiver unit 250. Antenna array 255 transmits forward channel signals received from RF transceiver unit 250 to wireless communication devices 110-111 in the coverage area of base station 106. Antenna array 255 also sends to RF transceiver unit 250 reverse channel signals received from wireless communication devices 110-111 in the coverage area of base station 106. In an exemplary embodiment, antenna array 255 comprises a multi-sector antenna, such as a three-sector antenna, in which each antenna sector is responsible for transmitting and receiving in a coverage area corresponding to an arc of approximately 120°. Additionally, RF transceiver unit 250 may include an antenna selection unit to select among different antennas in antenna array 255 during both transmit and receive operations.

As described in more detail below, state machine 161 implements a collaborative state machine framework. The collaborative state machine framework is capable of launching or transitioning to two or more states concurrently. In other words, the collaborative state machine framework allows state machine 161 to operate in multiple states concurrently. This allows multiple tasks associated with the states to be performed or executed concurrently. For example, state machine 161 in base station controller 210 may transition to and operate in two states. One state may involve MSC 130 assigning a circuit identity code (CIC) to a requested telephone call, and another state may involve base station controller 210 assigning resources to the requested call. Because tasks for these concurrent states may be executed at the same time or at least partially overlap, the overall time needed to complete the tasks is reduced. As a result, the request for service may be completed more quickly.

Although illustrated in base station controller 210, it will be understood that state machine 161 may be implemented elsewhere. For example, state machine 161 may be implemented within base transceiver subsystem 220 or elsewhere within base station 106 without departing from the principles of the present invention.

In an exemplary embodiment, state machine 161 may comprise logic encoded in media. The logic includes functional instructions for carrying out program tasks, among other things. The media may comprise computer disks or other computer-readable media, application-specific integrated circuits (ASICs), field-programmable gate arrays (FPGAs), digital signal processors (DSPs), other suitable specific or general purpose processors, transmission media, or other suitable media in which logic may be encoded and utilized.

Figure 3:
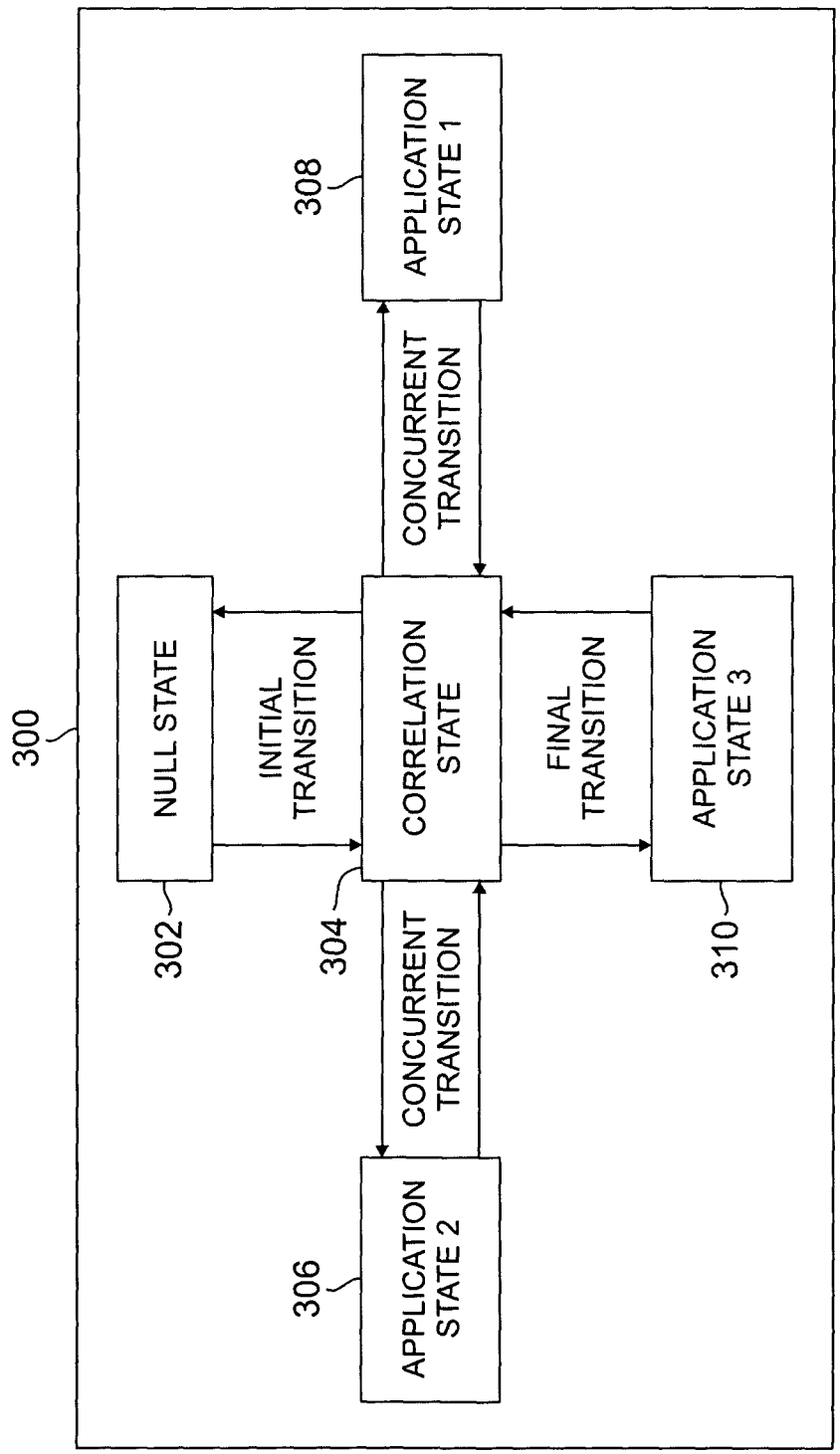
FIG. 3 illustrates a collaborative state machine framework used by the communication network of FIG. 1 according to one embodiment of this disclosure.

FIG. 3 illustrates collaborative state machine framework 300 in communication network 100 according to an exemplary embodiment of the present invention. Collaborative state machine framework 300 may be implemented by one or more of state machines 160-163 in communication network 100. The exemplary embodiment of collaborative state machine framework 300 illustrated in FIG. 3 is by way of example only and should not be construed to limit the scope of the present invention. Other collaborative state machine frameworks may be used without departing from the scope of the present invention. Collaborative state machine framework 300 may be used in any other communication network.

In an exemplary embodiment of the present invention, a state machine may represent a set of program code or other logic that contains a set of input events, a set of output events, and a set of states. The state machine may also comprise a function that maps input events and states to output events, a function that maps input events and states to other states (referred to as state transitions), and a description of the initial state. In addition, the transitions between states (represented as paths between the states in FIG. 3) typically involve the transfer of one or more messages or other data.

In the illustrated example, collaborative state machine framework 300 comprises null state 302. Null state 302 represents the initial state of state machines 160-163. In particular, null state 302 represents a state where no action is occurring to establish a voice connection or provide another service in communication network 100.

When a request for service is received, state machines 160-163 transition from null state 302 to correlation state 304. Correlation state 304 knows which tasks may be performed concurrently and correlation state 304 is capable of launching two or more concurrent states 306-308. When this occurs, state machines 160-163 transition to the two or more concurrent states 306-308.

Concurrent states 306-308 represent any suitable states, and each of concurrent states 306-308 may involve any suitable task or tasks. When each of concurrent states 306-308 is completed, correlation state 304 receives the results of those tasks. Correlation state 304 gathers and correlates the data generated during concurrent states 306-308. Correlation state 304 then transitions to final state 310.

Final state 310 represents the final or completed state of collaborative state machine framework 300. In final state 310, the requested service may be provided to one or more of wireless communication devices 110-113. State machines 160-163 support various attributes that implement collaborative state machine framework 300. These attributes may include concurrency, hierarchy, and collaboration.

Concurrency refers to the ability of one or more components in communication network 100 to execute multiple tasks associated with collaborative state machine framework 300, where the execution at least partially overlaps. Concurrency in collaborative state machine framework 300 involves identifying various ones of states 302-310 that may be grouped together and decoupled from other states 302-310. The decoupled states may then be implemented as separate tasks that are performed concurrently. As an example, states 302, 304, 310 may be grouped into one group and represent a single task. State 306 could be grouped by itself and represent another task. State 308 could be grouped by itself and represent a third task. In this example, at least portions of these tasks may be performed at the same time. This helps to increase the speed at which all of the tasks are completed, which reduces the time needed to satisfy a request for service (the time needed to reach and complete final state 310).

Figure 4:
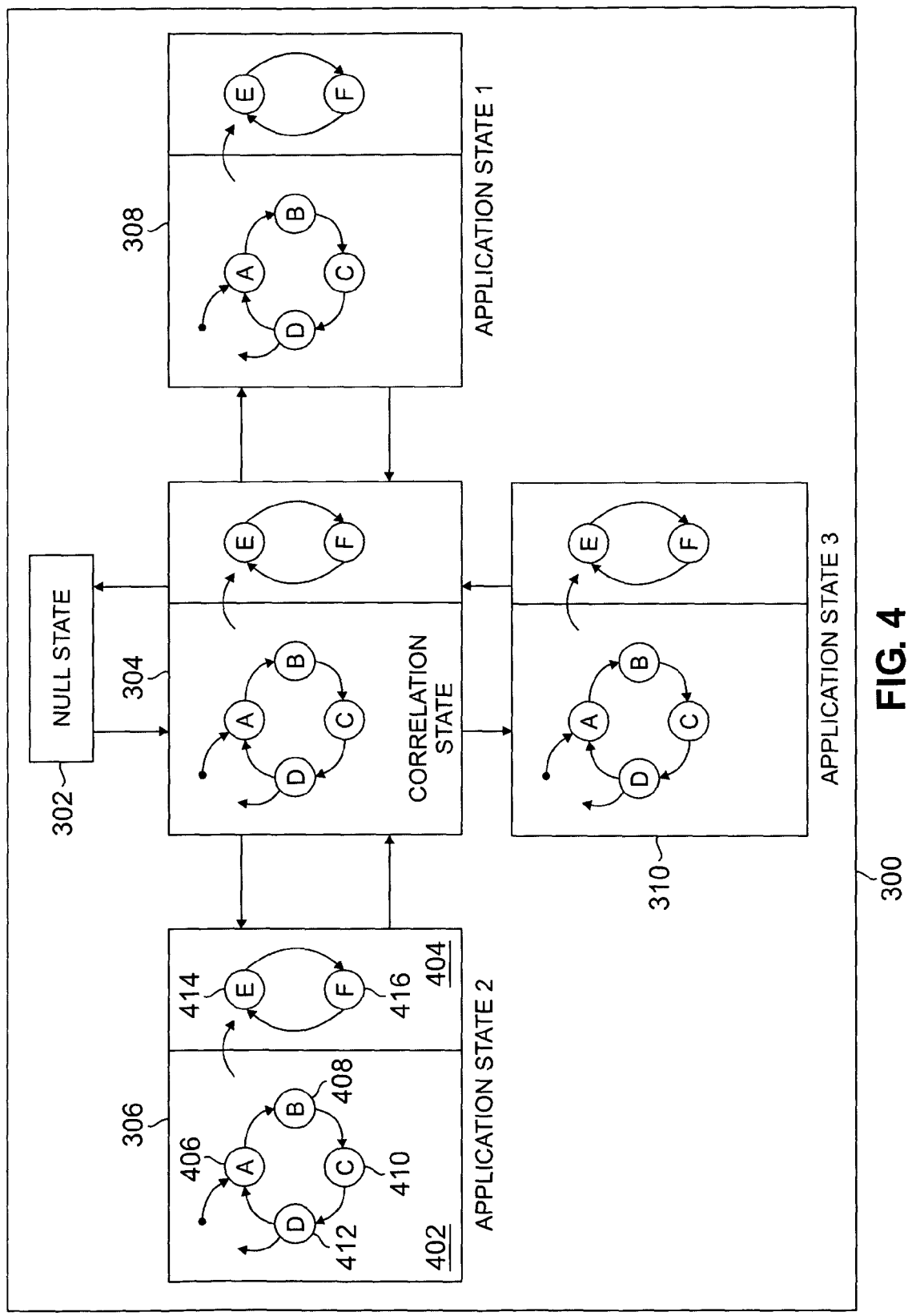
FIG. 4 illustrates additional details of the collaborative state machine framework used by the communication network of FIG. 1 according to one embodiment of this disclosure.

Hierarchy in collaborative state machine framework 300 refers to the classification of entities into successive levels (or tiers), where each level is subordinate to the level above. Hierarchy may be used to identify superior and subordinate relationships and to organize repetitive patterns in a standard, consistent approach. As described above, in collaborative state machine framework 300, multiple tasks may be executed or performed concurrently. One task may need to be informed of errors occurring in other tasks. Because of this, collaborative state machine framework 300 supports a hierarchy within each state or task. One example of the hierarchy is shown in FIG. 4, which is described below.

Collaboration in collaborative state machine framework 300 refers to communicating information, such as important events or errors, across various states 302-310. As an example, multiple tasks executed concurrently often need to share information on state transitions, data updates, exceptions, and events. Various mechanisms may be used to support collaboration in collaborative state machine framework 300, such as semaphores, shared memory, global data, and interrupts.

Correlation state 304 in collaborative state machine framework 300 represents a facilitator of collaboration within framework 300. Correlation state 304 contains knowledge of the concurrent tasks associated with concurrent states 306-308 and logic used to determine when a transition may be made to the next state (final state 310). Correlation state 304 also correlates the responses and data results from those concurrent states 306-308. Correlation of responses may be necessary, for example, when the transition to final state 310 depends on a particular combination of results from concurrent states 306-308. As a particular example, correlation of data may be necessary when some parameters are required in order for a transition to occur and dependencies are separated across concurrent tasks.

The embodiment of collaborative state machine framework 300 illustrated and described in FIG. 3 is by way of example only, and should not be construed so as to limit the scope of the present invention. Those skilled in the art will readily understand that various changes may be made to the embodiment in FIG. 3. For example, while FIG. 3 illustrates two concurrent states 306 and 308, collaborative state machine framework 300 may support any suitable number of concurrent states. Collaborative state machine framework 300 also may comprise multiple correlation states 304, each of which is capable of launching two or more concurrent states. Furthermore, each of states 302-310 in FIG. 3 may represent any combination of messages and sub-states. Collaborative state machine framework 300 may support additional states.

FIG. 4 illustrates additional details of collaborative state machine framework 300 used by communication network 100 according to an exemplary embodiment of the present invention. In particular, state machines 160-163 implement collaborative state machine framework 300 in communication network 100. The additional details of collaborative state machine framework 300 shown in FIG. 4 are by way of example only. Other collaborative state machine frameworks may be used without departing from the scope of this disclosure.

As described above, state machines 160-163 that support collaborative state machine framework 300 may implement a hierarchy. In collaborative state machine framework 300, multiple tasks may be executed concurrently, and one task may need to be informed of errors occurring in other tasks. To support this, collaborative state machine framework 300 implements a hierarchy within at least some of the states or tasks.

As shown in FIG. 4, at least some of states 304-310 include normal sub-state machine 402 and exception sub-state machine 404. In this example, normal sub-state machine 402 supports various sub-states 406-412. Sub-states 406-412 represent sub-tasks needed to perform the task associated with one of states 304-310. These sub-tasks may represent, for example, portions of a higher-level state (such as state 306) that has a superior-subordinate relationship or that is repetitive in nature.

In this example, exception sub-state machine 404 supports various exception sub-states 414-416. Exception sub-states 414-416 represent sub-tasks associated with exception or error handling. For example, exception sub-states 414-416 in one of states 304-310 may notify other states 304-310 of an error. Exception sub-states 414-416 may also perform clean-up operations once errors have occurred. In this way, exception (or error) handling may be performed within each one of states 304-310 and other ones of states 304-310 may be notified of the exceptions (or errors) and may act accordingly.

Dividing states in collaborative state machine framework 300 into normal sub-state machine 402 and exception sub-state machine 404 may help to simplify the logic needed to implement collaborative state machine framework 300. Moreover, this division may provide a straightforward mechanism for handling exceptions or errors.

Although FIG. 4 illustrates one example of additional details of collaborative state machine framework 300 used by communication network 100 of FIG. 1, various changes may be made to FIG. 4. For example, each of states 304-310 may include any number of sub-tasks in normal sub-state machine 402 and any number of sub-tasks in exception sub-state machine 404.

Figure 5:
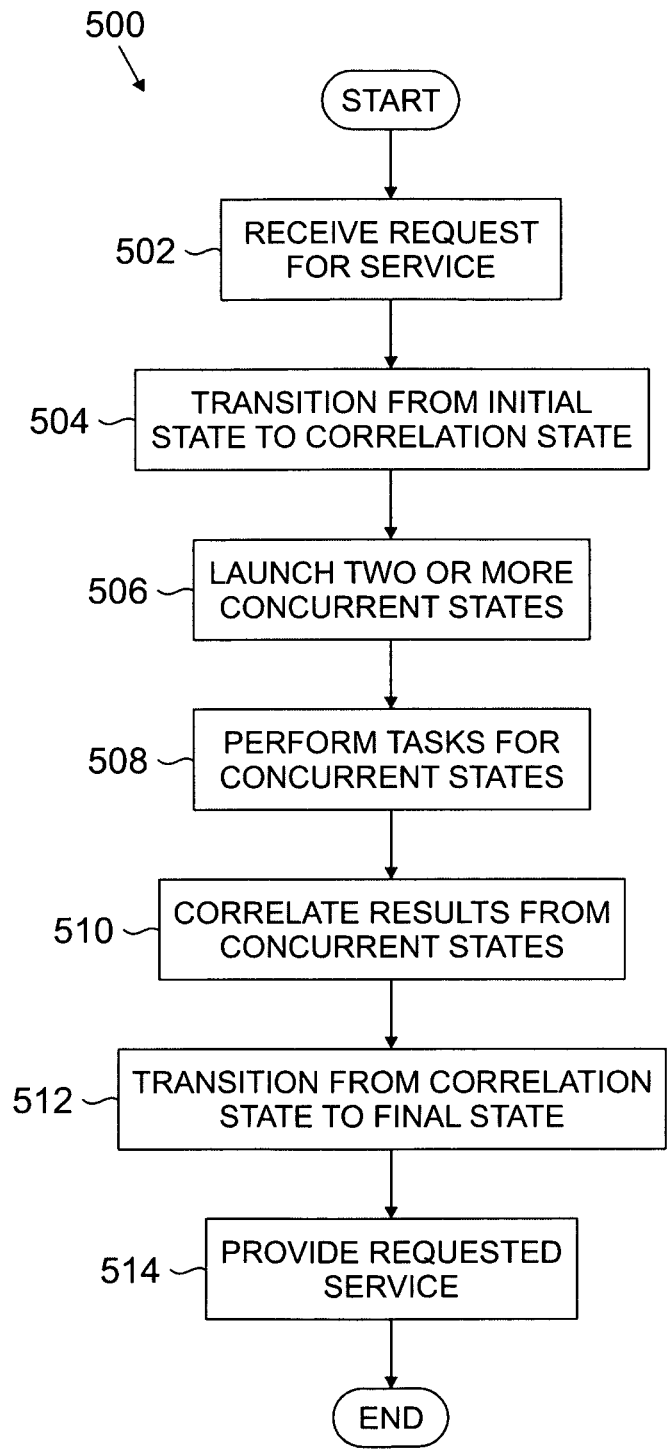
FIG. 5 is a flow diagram illustrating a method for providing service in the communication network of FIG. 1 according to one embodiment of this disclosure.

FIG. 5 depicts flow diagram 500, which illustrates a method for providing service in communication network 100 of FIG. 1 according to the principles of the present invention. For ease of explanation, flow diagram 500 is described with respect to state machine 161 operating in base station 106. The method may be used by any other device and in any other communication network without departing from the scope of the present invention.

Initially, a request for service is received (process step 502). This may comprise, for example, base station 106 receiving a request from wireless communication device 110. The request may represent a message indicating that a telephone voice connection is desired between wireless communication device 110 and a destination.

Next, state machine 161 transitions from null state 302 (process step 504). This may include, for example, state machine 161 transitioning from null state 302 to correlation state 304. Correlation state 304 then launches two or more concurrent states 306-308 (process step 506). This may include, for example, state machine 161 performing two or more transitions and operating in two or more concurrent states 306-308 at the same time.

Tasks associated with concurrent states 306-308 are then performed (process step 508). This may include, for example, MSC 130 assigning a CIC to the requested telephone call as part of one concurrent state 306. This may also include base station controller 210 assigning resources to the requested call as part of other concurrent state 308.

Next, correlation state 304 correlates the results from concurrent states 306-308 (process step 510). This may include, for example, correlation state 304 determining whether the tasks associated with concurrent states 306-308 were successfully completed. If not, correlation state 304 may take any suitable action, such as returning to null state 302.

If the tasks were successful, correlation state 304 places the results in any suitable format and transitions to the next state (process step 512). This may include, for example, state machine 161 transitioning from correlation state 304 to final state 310. After completion of any tasks associated with final state 310, communication network 100 provides the requested service (process step 514). This may include, for example, communication network 100 establishing a voice connection through network 100.

Although FIG. 5 illustrates one method of providing service in communication network 100, various changes may be made to FIG. 5. For example, state machine 161 may transition from null state 302 to one or more intermediate states before transitioning to correlation state 304. State machine 161 may transition to any number of correlation states 304 during the method. Furthermore, state machine 161 may transition from correlation state 304 to one or more intermediate states before transitioning to final state 310. Each correlation state 304 may launch any suitable number of concurrent states 306-308.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. For use in a communication network, an apparatus comprising:
    a processor comprising a state machine capable of transitioning between a plurality of states, wherein the plurality of states comprises at least two concurrent states, and wherein the plurality of states further comprises a correlation state capable of initiating transitions to the concurrent states and receiving results from execution of tasks associated with the concurrent states; and
    wherein the state machine is further capable of operating in the at least two concurrent states concurrently.

2. The apparatus as set forth in claim 1, wherein each of the concurrent states is associated with a task, and at least a portion of the task associated with one of the concurrent states is performed concurrently with at least a portion of the task associated with another of the concurrent states when the state machine operates in the concurrent states.

3. The apparatus as set forth in claim 1, wherein the correlation state is further capable of transitioning to another of the plurality of states based on the results.

4. The apparatus as set forth in claim 1, wherein at least one of the states is associated with a task comprising a plurality of sub-tasks and the at least one state comprises:
    a plurality of normal sub-states associated with the sub-tasks; and
    a plurality of exception sub-states associated with exception handling.

5. The apparatus as set forth in claim 4, wherein the exception sub-states associated with one of the states is capable of informing a task associated with at least one other state of an exception.

6. The apparatus as set forth in claim 1, wherein the plurality of states further comprises a correlation state, the correlation state capable of facilitating communication between tasks associated with at least two other states.

7. The apparatus as set forth in claim 6, wherein at least one of a semaphore, a shared memory, global data, and an interrupt is used to facilitate communication between the tasks associated with the at least two other states.

8. The apparatus as set forth in claim 1, wherein the apparatus comprises one of: a communication device, a base station, a mobile switching center, a packet data server node, a switch, and a router.

9. The apparatus as set forth in claim 1, wherein the apparatus comprises a stand-alone unit coupled to at least one of: a base station, a mobile switching center, a packet data server node, a switch, and a router.

10. A communication network comprising:
at least one processor capable of using a plurality of components, each of the components capable of communicating with at least one other of the components, at least one of the components also operable to communicate with one or more communication devices; and
at least one state machine capable of transitioning between a plurality of states, wherein at least one of the states is associated with at least one task needed to provide a service to at least one of the communication devices, and wherein the plurality of states comprises at least two concurrent states and the at least one state machine is capable of operating in the at least two concurrent states concurrently, wherein the plurality of states further comprises a correlation state capable of initiating transitions to the concurrent states and receiving results from execution of the tasks associated with the concurrent states.

11. The communication network as set forth in claim 10, wherein the plurality of components comprise at least one of: i) a base station, ii) a mobile switching center, and iii) a packet data server node; and the at least one communication device comprises at least one wireless communication device.

12. The communication network as set forth in claim 11, wherein the at least one state machine comprises a portion of at least one of: i) the communication device, ii) the base station, iii) the mobile switching center, and iv) the packet data server node.

13. The communication network as set forth in claim 11, wherein the state machine comprises a stand-alone unit coupled to at least one of: the base station, the mobile switching center, and the packet data server node.

14. The communication network as set forth in claim 10, wherein at least a portion of the task associated with one of the concurrent states is performed concurrently with at least a portion of the task associated with another of the concurrent states when the state machine operates in the concurrent states.

15. The communication network as set forth in claim 10, wherein the correlation state is further capable of transitioning to another of the plurality of states based on the results.

16. The communication network as set forth in claim 10, wherein at least one of the tasks associated with at least one of the states comprises a plurality of sub-tasks and the at least one state comprises:
a plurality of normal sub-states associated with the sub-tasks; and
a plurality of exception sub-states associated with exception handling.

17. For use in a communication network, a method of operating a plurality of state machines comprising:
transitioning, at a processing device, from an initial state to a plurality of additional states in response to a request for service, at least two of the additional states comprising at least two concurrent states, wherein the step of transitioning to the additional states comprises operating in the at least two concurrent states concurrently, wherein the plurality of additional states further comprises a correlation state capable of initiating transitions to the concurrent states and receiving results from execution of the tasks associated with the concurrent states; and
transitioning, at the processing device, to a final state associated with providing the requested service.

18. The method as set forth in claim 17, wherein transitioning from the initial state to the plurality of additional states comprises transitioning to a correlation state, wherein the correlation state is capable of initiating transitions to the concurrent states.

19. The method as set forth in claim 17, wherein each of the concurrent states is associated with a task and wherein operating in the at least two concurrent states concurrently comprises:
performing, at the processing device, at least a portion of the task associated with one of the concurrent states concurrently with at least a portion of the task associated with another of the concurrent states.

20. The method as set forth in claim 17, wherein at least one of the states is associated with a task comprising a plurality of sub-tasks and the at least one state comprises:
a plurality of normal sub-states associated with the sub-tasks; and
a plurality of exception sub-states associated with exception handling.

* * * * *